(12) United States Patent
Minero Ramales et al.

(10) Patent No.: US 11,794,569 B2
(45) Date of Patent: Oct. 24, 2023

(54) AIR INLET SHUT-OFF DEVICE FOR A MOTOR VEHICLE, WITH AN AUTOMATIC RETURN SYSTEM

(71) Applicant: VALEO SYSTEMES THERMIQUES, La Verriere (FR)

(72) Inventors: Victor Manuel Minero Ramales, La Verriere (FR); Frederic Vacca, La Verriere (FR); Karim Arab, La Verriere (FR); Laura Marion, La Verriere (FR); Sylvain Gerber, La Verriere (FR)

(73) Assignee: Valeo Systemes Thermiques, La Verriere (FR)

( * ) Notice: Subject to any disclaimer, the term of this patent is extended or adjusted under 35 U.S.C. 154(b) by 0 days.

(21) Appl. No.: 17/855,853

(22) Filed: Jul. 1, 2022

(65) Prior Publication Data
US 2023/0001783 A1    Jan. 5, 2023

(30) Foreign Application Priority Data
Jul. 5, 2021 (FR) ...................................... 2107228

(51) Int. Cl.
*B60K 11/08* (2006.01)
(52) U.S. Cl.
CPC ................... *B60K 11/085* (2013.01)
(58) Field of Classification Search
CPC ............. B60K 11/085; B60Y 2306/13; B60Y 2400/164; B60Y 2400/404; Y02T 10/88
See application file for complete search history.

(56) References Cited

U.S. PATENT DOCUMENTS

| 18,536 A | * | 11/1857 | Currier et al. | ............ E06B 9/78 |
| | | | | 160/319 |
| 1,516,785 A | * | 11/1924 | Pratt | ......................... F01P 7/10 |
| | | | | 165/DIG. 94 |

(Continued)

FOREIGN PATENT DOCUMENTS

| DE | 3701584 A1 | 8/1988 |
| DE | 102014109342 A1 | 1/2016 |
| FR | 2738779 A1 | 3/1997 |

OTHER PUBLICATIONS

European Patent Office, Preliminary Search Report and Opinion of corresponding application No. FR2107228, dated Mar. 18, 2022.

*Primary Examiner* — Kurt Philip Liethen
(74) *Attorney, Agent, or Firm* — Valeo Systemes Thermiques

(57) ABSTRACT

An air inlet shut-off device for a motor vehicle having: a support frame defining a passage opening for an incoming air flow, a curtain movable between a closed position and an open position, an automatic return system for the curtain having: an elastic element which is elastic in elongation along the rolling axis of the roller shaft and secured to the latter in such a way as to be rotated and vice versa; a cylindrical slider intended to move in translation along the rolling axis and in rotation about this same axis, said slider being secured to the elastic element in such a way as to be rotated indirectly by the roller shaft, said slider including a helical groove on its outer surface, the support frame including a fixed finger configured to be inserted in said helical groove.

7 Claims, 5 Drawing Sheets

(56) References Cited

U.S. PATENT DOCUMENTS

| | | | | |
|---|---|---|---|---|
| 1,823,909 | A * | 9/1931 | Meier | A47H 5/06 160/343 |
| 6,123,140 | A * | 9/2000 | Bergamaschi | E06B 9/60 185/43 |
| 11,142,060 | B2 * | 10/2021 | Gallagher Gil | B60K 11/085 |
| 11,505,059 | B2 * | 11/2022 | Cowan | B60K 11/085 |
| 2004/0154759 | A1 * | 8/2004 | Minder | E06B 9/60 160/298 |
| 2011/0203861 | A1 * | 8/2011 | Charnesky | B60K 11/085 180/68.1 |
| 2015/0246608 | A1 * | 9/2015 | Schmidt | B60K 11/04 160/309 |
| 2020/0156461 | A1 * | 5/2020 | Droulez | B60K 11/085 |
| 2021/0162858 | A1 * | 6/2021 | Mitidieri | B60K 11/04 |

* cited by examiner

US 11,794,569 B2

AIR INLET SHUT-OFF DEVICE FOR A MOTOR VEHICLE, WITH AN AUTOMATIC RETURN SYSTEM

CROSS-REFERENCE TO RELATED APPLICATIONS

This application claims the benefit of French application No. 2107228 filed on Jul. 5, 2021, the disclosure of which is herein incorporated by reference in its entirety

TECHNICAL FIELD

The invention relates to an air inlet shut-off device for a motor vehicle. The invention is in particular intended to be fitted at a front end of said vehicle so as to facilitate or, conversely, to shut off the passage for an air flow into a cooling module arranged inside the motor vehicle. The air flow is more specifically intended to circulate inside one or more heat exchangers provided inside said cooling module.

BACKGROUND OF THE INVENTION

It is common practice to use such an air inlet shut-off device to reduce the drag coefficient, and also to improve cooling and air-conditioning performance in a motor vehicle. Such a shut-off device can for example comprise at least one curtain that can move between a closed position in which it shuts off a passage opening for the air flow and an open position in which the air flow is able to circulate through this same passage opening. Such a device is usually known as an ACS (Active Curtain Shutter).

The ACS is preferably installed in a grille of the motor vehicle. With the curtain in the open position, air can circulate through the grille and help in particular to cool the engine of the motor vehicle. With the curtain in the closed position, air does not enter via the grille, which reduces drag and thus makes it possible to reduce fuel consumption and carbon dioxide emissions. The ACS thus makes it possible to reduce energy consumption and contamination when the engine does not need to be cooled by exterior air.

The curtain of an ACS is generally flexible, which means that it can be stowed compactly by rolling it up on itself around a roller shaft when it takes up its open position. The roller shaft is generally secured along one of the sides of the passage opening of the ACS and connected to a drive device so as to roll up the curtain around said roller shaft to bring it into the open position and so as to unroll the curtain to bring it into the closed position.

If the drive device breaks down or becomes jammed, the curtain can get stuck in its closed position, but the curtain getting stuck in this position can limit the circulation of the air flow and have a negative impact on the performance of the heat exchangers inside the cooling module.

The aim of the present invention is therefore to at least partially overcome the drawbacks encountered in the prior art and to propose an improved ACS that makes it possible to bring the curtain into its open position even in the event of failure of the drive device.

BRIEF SUMMARY OF THE INVENTION

The present invention therefore relates to an air inlet shut-off device for a motor vehicle, the shut-off device comprising a support frame including a first and a second crosspiece that are parallel to one another and connected by lateral uprights so as to define at least one passage opening for an incoming air flow, said device including at least one curtain that can move between a closed position in which the curtain at least partially covers the passage opening and an open position in which said curtain allows the incoming air flow to pass through the passage opening, said curtain including an edge secured to a roller shaft extending on the support frame along one of the sides of the passage opening, the roller shaft being connected to a drive device so as to roll up the curtain around said roller shaft to bring it into the open position and so as to unroll the curtain to bring it into the closed position, the shut-off device being characterized in that it further comprises an automatic return system for the curtain which includes:
an elastic element which is elastic in elongation along the rolling axis of the roller shaft, said elastic element being secured at a first of its ends to the roller shaft in such a way as to be rotated by said roller shaft and vice versa,
a cylindrical slider intended to move in translation along the rolling axis of the roller shaft and in rotation about this same axis, said slider being secured to a second end of the elastic element in such a way as to be rotated indirectly by the roller shaft and vice versa, said slider also including a helical groove on its outer surface, the support frame including a fixed finger configured to be inserted in the helical groove on the slider.

By virtue of the elastic energy stored in the elastic element of the curtain return system when the curtain goes from the open position to the closed position, and by virtue of the kinematics of the slider indirectly connected to the roller shaft via the elastic element, it is possible rotate the roller shaft via the automatic return system so as to force the curtain to take up its open position to allow the air flow to circulate through the passage opening, even if the drive device is not working. The automatic return system thus makes it possible to bring the curtain back into its open position in order to free the passage opening through the frame of the device, thus allowing the air flow to circulate inside the cooling module comprising one or more heat exchangers, thereby preventing the engine of the motor vehicle from heating up too much.

The invention can further comprise one or more of the following aspects taken alone or in combination:
the elastic element of the automatic return system for the curtain is a spring having turns helically wound around the rolling axis of the roller shaft;
the elastic element is a traction spring;
the cylindrical slider has, at its end connected to the elastic element, a wall forming a housing space intended to receive at least some of the turns of the elastic element;
endings of the helical groove on the outer face of the cylindrical slider form stops configured to come into contact with the fixed finger of the support frame so as to define the terminal positions of the slider in its translational movement along its axis of movement;
the device includes a central pin arranged inside the hollow end of the roller shaft such that it projects from said end;
the central pin is configured to move in translation inside the hollow end of the roller shaft along the rolling axis;
the slider is rigidly secured to the central pin;
one end of the roller shaft has a shoulder;
the cylindrical slider and the elastic element are positioned coaxially to this shoulder so as to be movable in translation on this shoulder along the rolling axis; and a linear ball bearing is interposed between the shoulder at the end of the roller shaft and the cylindrical slider.

BRIEF DESCRIPTION OF THE DRAWINGS

Note that all of the features and configurations described above are purely examples. Other features, details and advantages of the invention will become clearer on reading the detailed description set out below, together with several embodiments provided purely as examples and by way of indication, with reference to the attached schematic drawings, in which:

FIG. 3 is a schematic view in section along the plane A-A of the device of FIG. 2a;

FIG. 4a is a schematic figure showing the automatic return system for the curtain in the open position of the device of FIG. 2a;

DETAILED DESCRIPTION OF THE INVENTION

In the various figures, identical elements bear the same reference signs.

The following embodiments are examples. Although the description refers to one or more embodiments, this does not necessarily mean that each reference relates to the same embodiment, or that the features only apply to a single embodiment. Individual features of various embodiments can also be combined or interchanged in order to create other embodiments.

In the present description, some elements or parameters can be indexed, such as, for example, a first element or a second element and a first parameter and a second parameter or even a first criterion and a second criterion, etc. In this case, this is simply indexing for differentiating and naming elements or parameters or criteria that are similar but not identical. Such indexing does not imply that one element, parameter or criterion has priority over another and such names can easily be interchanged without departing from the scope of the present description. Such indexing also does not imply an order in time, for example, for assessing such or such a criterion.

Figure 1:
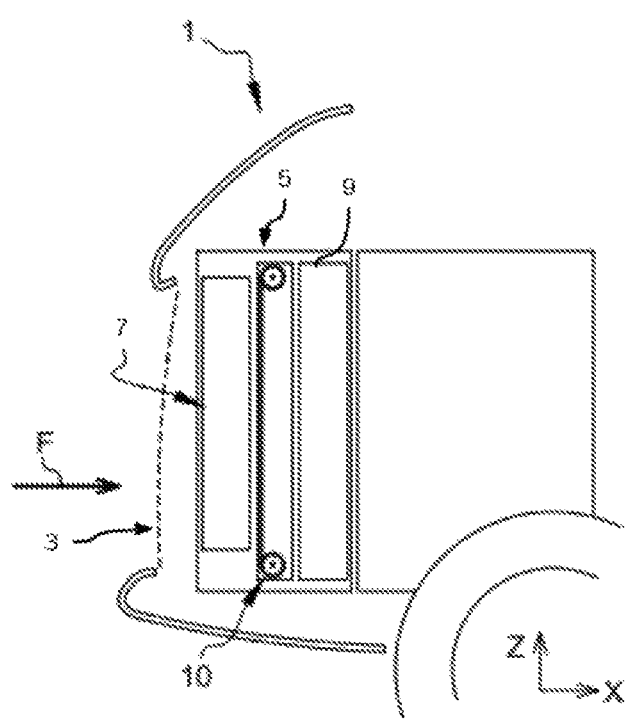
FIG. 1 schematically shows, in side view, the front end of a motor vehicle comprising an air inlet shut-off device according to the invention along with a cooling module.

FIG. 1 shows, in a sectional side view, a shut-off device 10 for shutting off an air inlet for an air flow F arranged at the front end of a motor vehicle 1. The air flow F flows substantially parallel to a direction X which corresponds to the longitudinal axis of the motor vehicle 1. The air inlet shut-off device 10 is in particular arranged behind a grille 3 fitted at the front end of the motor vehicle 1. A cooling module 5 which includes at least one heat exchanger 7, 9 through which the air flow F is intended to pass as it enters the motor vehicle 1 via the grille 3, is also placed behind the grille. The heat exchanger or exchangers 7, 9 extend in planes parallel to those generated by the directions Y and Z of the trihedron XYZ. In the example shown in FIG. 1, the cooling module 5 includes more specifically two heat exchangers 7 and 9 which are arranged on either side of the shut-off device 10 along the axis X.

The cooling module 5 comprises for example an upstream heat exchanger 7 (left-hand side in FIG. 1), upstream relative to the direction of circulation of the air flow F, and a downstream heat exchanger 9 (right-hand side in FIG. 1) arranged in series along the longitudinal axis X of the motor vehicle 1. In this particular arrangement, it is the upstream heat exchanger 7 through which the air flow F passes first, and the downstream heat exchanger 9 second.

The upstream heat exchanger 7 is for example a cooling radiator, referred to as a low-temperature cooling radiator, which acts to cool a coolant in a heat exchange loop, referred to as a low-temperature loop, and comprising in particular an air-conditioning condenser and/or a charge air cooler. The downstream heat exchanger 9 is, for example, a high-temperature cooling radiator intended to cool a coolant in a heat exchange loop comprising an engine of the vehicle. The air that passes through this downstream exchanger 9 cools the engine coolant.

Figure 2A:
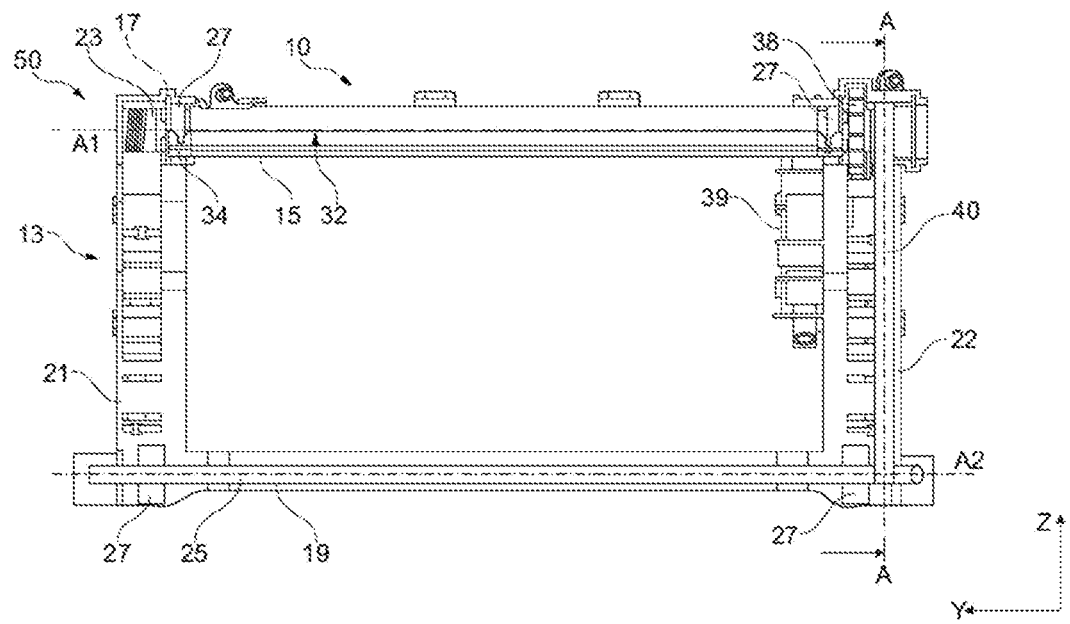
FIG. 2a is a schematic end-on view of an air inlet shut-off device in which the curtain is in the open position.
Figure 2B:
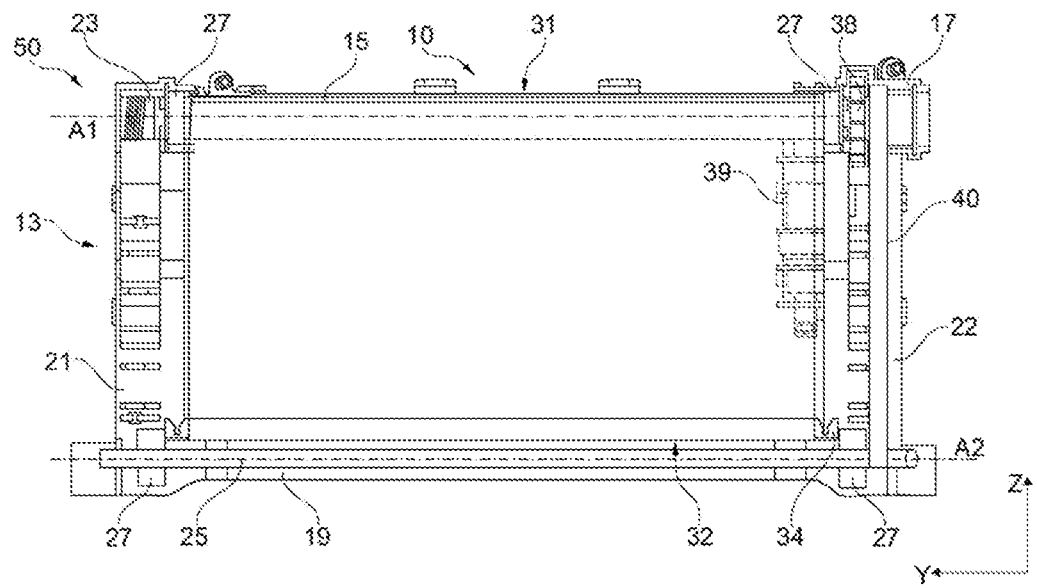
FIG. 2b is a figure similar to FIG. 2a in which the curtain is in the closed position.

As shown for example in FIGS. 2a and 2b, the air inlet shut-off device 10 comprises a support frame 13 configured to support a curtain 15. The support frame 13 includes more specifically a first crosspiece 17 and a second crosspiece 19 opposite the first crosspiece 17. The first crosspiece 17 and the second crosspiece 19 are parallel to one another and oriented substantially horizontally across the width of the vehicle. In FIGS. 2a and 2b, the first crosspiece 17 and the second crosspiece 19 are oriented in the direction Y.

The support frame 13 further comprises two lateral uprights 21, 22 which extend between the ends of the first crosspiece 17 and the second crosspiece 19 of the support frame 13 so as to define at least one passage opening intended to be taken by the air flow F passing through the grille 3 at the front end of the motor vehicle 1. The two lateral uprights 21, 22 are oriented substantially vertically in the direction Z.

The support frame 13 of the air inlet shut-off device 10 is in particular rigid; it is for example made of plastic. The first and second crosspieces 17 and 19 and the lateral uprights 21 and 22 are in particular produced by injection molding. In order to improve the stiffness of said support frame 13 the latter can be molded as a single component.

The support frame 13 supports a curtain 15 that can move between a closed position (shown in FIG. 2b) in which the curtain 15 at least partially covers the passage opening defined by the extent of the support frame 13 and an open position (shown in FIG. 2a) in which said curtain 15 allows the incoming air flow F to pass through the passage opening.

The curtain 15 includes a first edge 31 secured to a first roller shaft 23 extending on the support frame 13 along one of the sides of the passage opening. The curtain 15 further includes a second edge 32 opposite its first edge 31. The second edge 32 of the curtain 15 can be rigidly secured to a rod 34 which can in particular stiffen said second edge 32. The ends of the rod 34 can moreover be positioned in rails arranged on the lateral uprights 21 and 22 of the frame 13. The rod 34 thus makes it possible to hold the curtain 15 in place against the support frame 13 and to guide the curtain 15 in its movement between its open position and its closed position.

The curtain 15 can in particular be obtained by cutting. It is for example made of a flexible material, such as a glass fiber-based cloth covered with an impermeable, water-repellent coating.

The curtain 15 can in particular take the form of a rectangular or trapezoidal cloth. The dimensions of the curtain 15 overall correspond to the dimensions of the support frame 13. The lengths of the first 31 and second 32 edges of the curtain 15 correspond approximately and respectively to the length of the first crosspiece 17 and to the length of the second crosspiece 19. The gap between the first 31 and the second 32 edges of the curtain 15 is in particular greater than or equal to the distance separating the first 17 and the second 19 crosspiece in the direction of closure and opening of the curtain 15.

Figure 3:
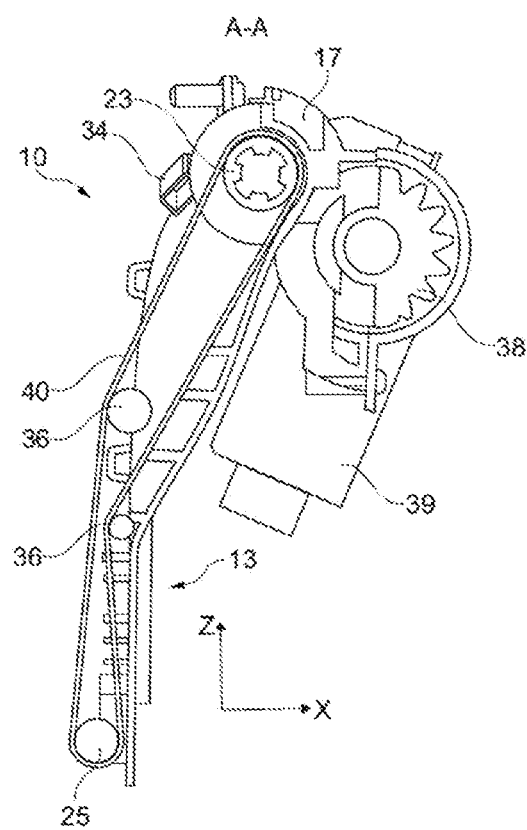

In the embodiment of the shut-off device 10 shown in FIGS. 2a, 2b and 3, the first roller shaft 23 is arranged at the first crosspiece 17 of the support frame 13. The first roller shaft 23 moreover extends parallel to the first crosspiece 17.

The shut-off device 10 further comprises a second roller shaft 25 extending on the support frame 13, along a side of the passage opening opposite to that bearing the first roller shaft 23. The second roller shaft 25 is in particular arranged at the second crosspiece 19 of the support frame 13. The second roller shaft 25 moreover extends parallel to the second crosspiece 19 of the support frame 13.

The first 23 and the second 25 roller shafts are therefore parallel to one another. In the example shown in FIGS. 2a to 3, the first roller shaft 23 is arranged above the second roller shaft 25. In other words, the first roller shaft 23 is closer to the roof of the motor vehicle 1 while the second roller shaft 25 is closer to the base of the motor vehicle 1.

The first 23 and the second 25 roller shafts are each connected to the support frame 13 by bearings 27 so as to be able to rotate about a rolling axis A1, A2 belonging to each roller shaft 23 or 25. These rolling axes A1, A2 are preferably parallel to the first 17 and second 19 crosspieces of the support frame 13.

The first roller shaft 23, to which the first edge 31 of the curtain 15 is secured, is connected to a drive device 38 (visible in FIGS. 2a and 3) so as to roll up the curtain 15 around said first roller shaft 23 in order to bring it into the open position and so as to unroll the curtain 15 in order to bring it into the closed position. This drive device 38 interacts for example with an electric actuator 39 secured to the support frame 13 and connected to the first roller shaft 23 by a gear system (visible in FIG. 3).

The shut-off device 10 further includes a transfer element 40 for transferring the rotation of the first roller shaft 23 to the second roller shaft 25. According to a first embodiment of the transfer element 40 shown more specifically in FIG. 3, it can include a notched belt connecting the first roller shaft 23 and the second roller shaft 25, passing via the tensioner pulleys 36 arranged on the support frame 13. Thus, when the first roller shaft 23 is rotated by the drive device 38 under the effect of the actuator 39, the notched belt of the transfer element 40 rotates the second roller shaft 25. The notches on this type of belt limit the risk that the belt will slip on the roller shafts 23 and/or 25 or on the tensioner pulleys 36 when they are rotating. Such a belt fitted to the transfer element 40 is not very energy intensive and transmits the movement effectively without generating too much noise.

According to a second embodiment (not shown) of the transfer element 40, this can include at least one pinion arranged on each of the first and second roller shafts 23 and 25. Said pinions are connected by a transmission chain such that when the first roller shaft 23 is rotated by the drive device 38, the assembly formed by the pinions and the chain rotates the second roller shaft 25. This embodiment advantageously differs from the above embodiment by its long lifetime.

Thus, when the curtain 15 is rolled up around the first roller shaft 23, this corresponds to its open position and the air flow F can circulate through the passage opening so as to reach the heat exchangers 7, 9 of the cooling module 5 arranged behind the grille 3. Rolling up the curtain 15 around the first roller shaft 23 with which it is associated makes it possible to stow it easily and compactly when it is in its open position.

When the curtain 15 is unrolled (FIG. 2b), it extends between the first 17 and the second 19 crosspiece of the support frame 13 in the direction of closure and opening of the curtain 15, thus obstructing the air flow F by blocking the passage opening. This then corresponds to its closed position.

In the event of failure of the opening system which includes, inter alia, the drive device 38, the actuator 39 and the transfer element 40 connecting the first and the second roller shafts 23, 25, the curtain 15 can get stuck in the closed position. Staying in the closed position can be detrimental as it limits the circulation of the air flow F in particular at low speeds of travel. This can result in less efficient cooling which can potentially lead to overheating.

Figure 4A:
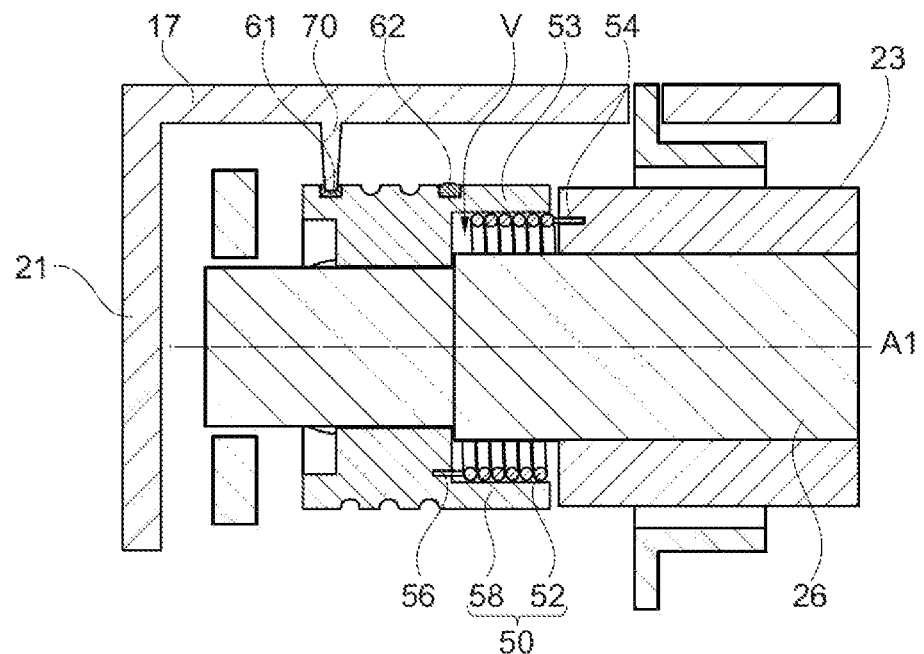
Figure 4B:
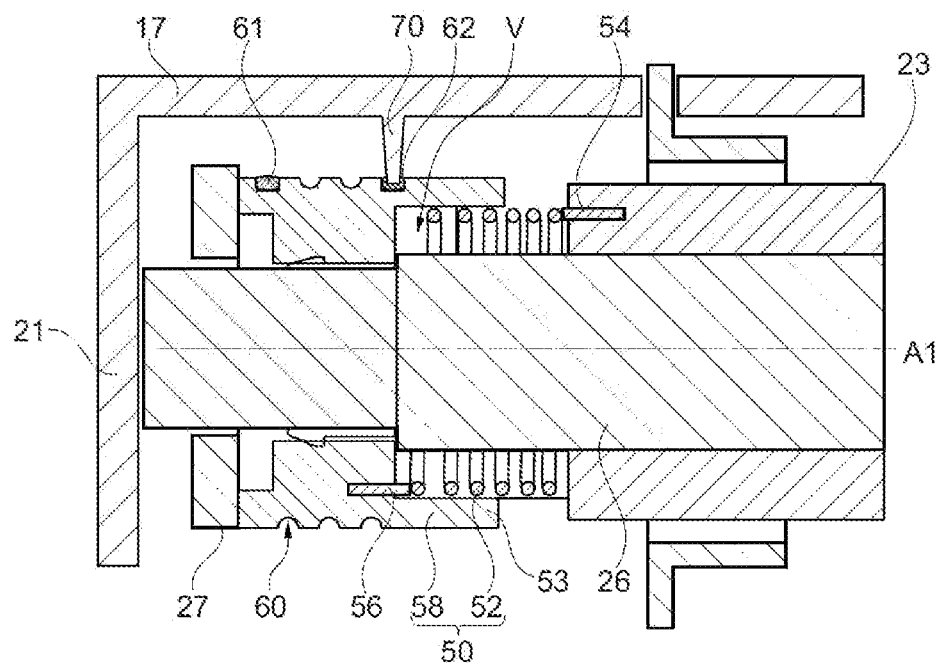
FIG. 4b is a schematic figure similar to FIG. 4a and shows the automatic return system for the curtain in the closed position of the device of FIG. 2b.
Figure 5:
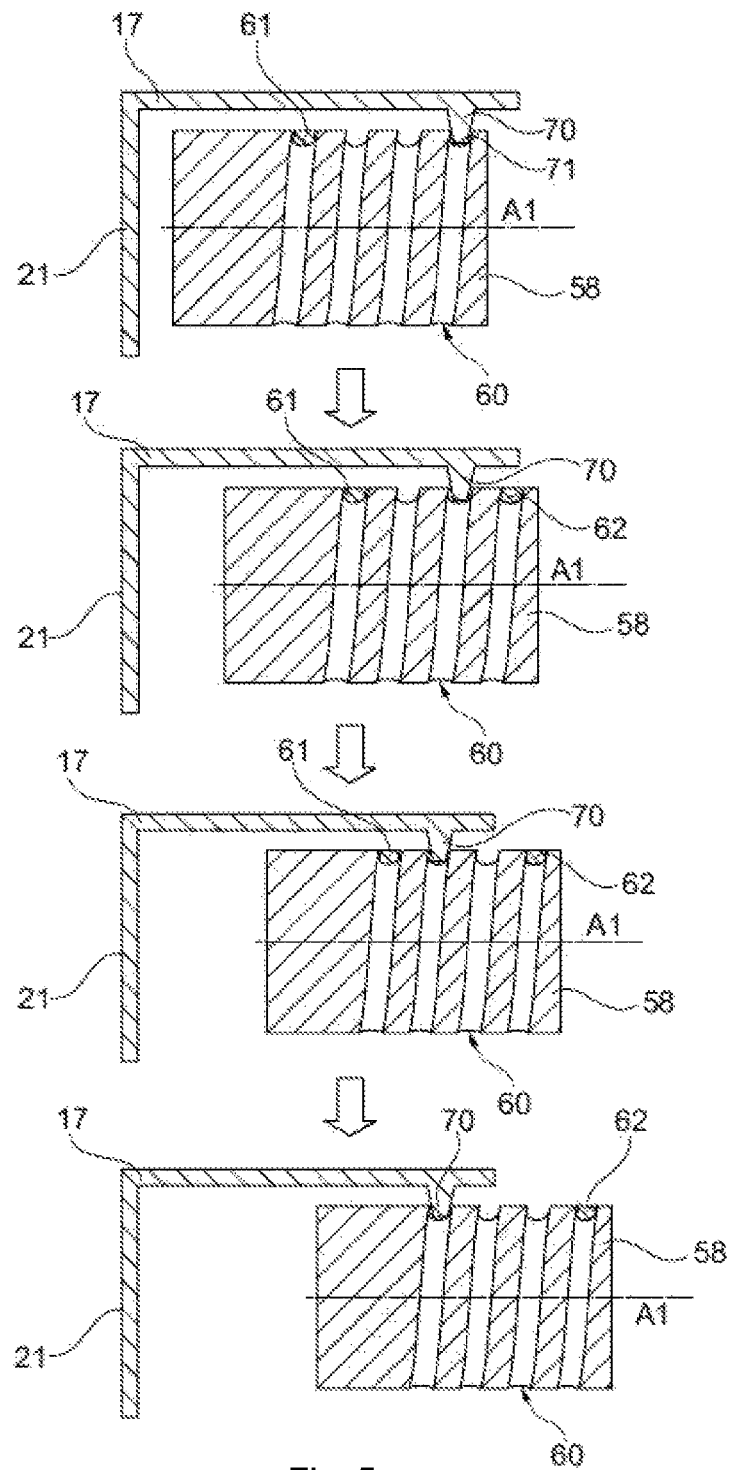
FIG. 5 is a schematic view of the slider in movement, step by step.

To overcome this drawback, the shut-off device 10 also includes an automatic return system 50 for the curtain 15 which is shown in detail in FIGS. 4a, 4b and 5. This automatic return system 50 is in particular arranged between the support frame 13 and the roller shaft 23 and makes it possible to automatically open the curtain 15 if the opening system described above breaks down.

This automatic return system 50 is more specifically arranged at one end of the roller shaft 23. According to a particular embodiment of the shut-off device 10 shown in FIGS. 2a and 2b, the drive device 38 and the automatic return system 50 for the curtain 15 are arranged at opposite ends of the first roller shaft 23, i.e. in the upper corners of the support frame 13.

The automatic return system 50 includes, on the one hand, an elastic element 52 which is elastic in elongation along the rolling axis A1 and, on the other hand, a cylindrical slider 58 intended to move in translation along the rolling axis A1 of the roller shaft 23 and in rotation about this same axis A1.

The elastic element 52 and the slider 58 rotate as one with the first roller shaft 23. Thus, when said shaft 23 turns about its rolling axis A1, the elastic element 52 and the slider 58 are also rotated about this axis A1.

The element 52 is "elastic in elongation" in the sense that it is deformable longitudinally along the rolling axis A1 of the first roller shaft 23. The elastic element 52 is more specifically configured to be stretched and possibly compressed along this rolling axis A1.

According to the embodiment shown in FIGS. 4a and 4b, the elastic element 52 can take the form of a spring having turns helically wound around the rolling axis A1 of the roller shaft 23. In this specific embodiment, the elastic element 52 resembles more specifically a traction spring. As well as being economical, this specific configuration of the elastic element 52 is notable for its relatively low weight and advantageous compactness inside the automatic return system 50.

The elastic element 52 is arranged between an end of the roller shaft 23 and the slider 58, it includes more specifically a first end 54 secured to the first roller shaft 23 and a second end 56 secured to the slider 58. From the kinematic point of view, the elastic element 52 is secured by its first end 54 to the roller shaft 23 in such a way as to be rotated by said roller shaft 23 and vice versa. In other words, when the roller shaft 23 is rotated by the drive device 38, the first end 54 of the elastic element 52 secured to the roller shaft 23 is itself also rotated about the rolling axis A1, thus causing the entire elastic element 52 to rotate about this same axis A1.

Since the second end 56 of the elastic element 52 is secured to the slider 58, the latter is itself also rotated about the rolling axis A1 when the elastic element 52 turns about the rolling axis A1. In other words, the slider 58 is secured to the second end 56 of the elastic element 52 in such a way as to be indirectly rotated by the roller shaft 23 and vice versa.

The term "vice versa" in this case means that rotation about the rolling axis A1 initiated by the slider 58 can also rotate both the elastic element 52 and the roller shaft 23 about this same axis A1 in the absence of resistance to the movement from the drive device 38.

The slider 58 is intended to move in translation along the rolling axis A1 of the roller shaft 23 in addition to its rotation about this same axis A1 caused indirectly by the roller shaft 23. The slider 58 has a cylindrical shape and includes on its outer surface a helical groove 60 similar to a screw thread. In an area contiguous to the place where the slider 58 is arranged, the support frame 13 includes a fixed finger 70 configured to be inserted in the helical groove 60 made in the outer surface of the cylindrical slider 58.

The helical groove 60 can have endings 61, 62 which form stops configured to come into contact with the fixed finger 70 of the support frame 13 so as to define the terminal positions of the slider 58 in its translational movement along its axis of movement A1.

More specifically, when the curtain 15 is in the open position, an end of the fixed finger 70 is in contact with a first ending 61 of the helical groove 60, as shown in FIG. 4a. The slider 58 is then closest to the end of the roller shaft 23 and the elastic element 52 is compressed. In the case where the elastic element 52 is a helical spring, the turns of said spring are very close to one another.

Conversely, when the curtain 15 is in the closed position, the end of the fixed finger 70 is in contact with a second ending 62 of the helical groove 60, as shown in FIG. 4b. The slider 58 is then closer to the lateral upright 21 of the support frame 13 than in its previous position and the elastic element 52 is stretched.

The interaction between the fixed finger 70 and the helical groove 60 of the slider 58 imposes a coupling between the translational movement of the slider 58 along the rolling axis A1 and the rotation of the slider 58 about this same axis A1. The distance travelled in translation by the slider 58 thus depends on the number of turns of the helical groove 60 on the outer surface of the slider 58 and on the gap between two neighboring turns of said groove 60. More specifically, each rotation of the slider 58 about the rolling axis A1 shifts the slider 58 in translation along this axis A1 such that the fixed finger 70 of the support frame 13 is positioned in one of the turns neighboring the turn in which it was situated previously. This is more specifically shown in FIG. 5 in which the movement of the slider 58 is shown step by step from the moment when the fixed finger 70 is in contact with the ending 62 of the helical groove 60 (closed position of the curtain 15) to the moment when the fixed finger 70 is in contact with the ending 61 of the helical groove 60 (open position of the curtain 15).

To prevent expansion of the diameter of the turns of the elastic element 52 in a radial direction, perpendicular to the rolling axis A1, the slider 58 can have, at its end connected to the elastic element 52, a wall 53 forming a cylindrical housing space V intended to receive at least some of the turns of the elastic element 52. The number of turns, their spacing and the cylindrical housing space V delimited by the wall 53 at the end of the slider 58 can be dimensioned such that all of the turns or at least some of the turns of the elastic element 52 compressed or at rest are inside said housing space V, as in the example of FIG. 4a. The wall 53 forming the housing space V thus makes it possible to protect the elastic element 52 from any external contamination (water, dust, dirt, etc.). The wall 53 forming the housing space V also offers a compact arrangement of the components 52, 58 of the automatic return system 50 of the curtain 15 inside the shut-off device 10.

For further compactness, the end of the roller shaft 23 near which the automatic return system 50 for the curtain 15 is arranged can be hollow. The device 10 can thus include a central pin 26 arranged inside the hollow end of the roller shaft 23 such that the central pin 26 projects from said hollow end. This embodiment is more specifically shown in FIGS. 4a, 4b and 5.

In these same FIGS., the central pin 26 is connected to the support frame 13 by a bearing 27 so as to be able to turn about the rolling axis A1.

The central pin 26 is configured to move in translation along the rolling axis A1 inside the hollow end of the roller shaft 23. The slider 58 is rigidly secured to this central pin 26 so as to move in translation with the latter. The central pin 26 thus allows effective guidance of the slider 58 relative to the roller shaft 23 during its movements in translation along the rolling axis A1. The central pin 26 moreover prevents the diameter of the turns of the elastic element 52 from narrowing in a radial direction, perpendicular to the rolling axis A1.

According to another embodiment (not shown) of the automatic return system 50 for the curtain 15, the end of the roller shaft 23 near which said return system 50 is arranged has a shoulder. The cylindrical slider 58 and the elastic return element 52 are thus arranged on this shoulder so as to be movable on the surface of said shoulder along the rolling axis A1. In this particular embodiment, a linear ball bearing (non shown in the figures) can be interposed between the shoulder at the end of the roller shaft 23 and the slider 58 so as to allow precise guidance in straight translation of the slider 58 along the rolling axis A1 as well as allowing rotation of the slider 58 about this same axis A1. This embodiment can make it possible to reduce friction between the parts in addition to increasing the load capacity in this connection.

When the curtain 15 is unrolled from its open position to its closed position, the finger 70 interacts with the helical groove 60 on the surface of the slider 58, which is rotated by the roller shaft 23 via the elastic element 52. This interaction between the finger 70 and the helical groove 60 thus gives rise to a movement of the slider 58 in translation along the rolling axis A1, thereby causing elongation of the elastic element 52 along this same axis A1. During this movement, the first end 54 and the second end 56 of the elastic element 52 are moved away from one another. In the case where the elastic element 52 is a spring with turns wound around the rolling axis A1, these turns are thus apart from one another. The elastic element 52 thus accumulates elastic energy.

If the drive device 38 should break down, the energy accumulated via the elastic element 52 can be released so as to cause a movement of the slider 58 which rotates the roller shaft 23 about the rolling axis A1 so as to bring the curtain 15 into its open position. The interaction between the finger 70 and the helical groove 60 on the surface of the slider 58 moves the latter in translation and in rotation until the finger 70 is blocked in the ending 61 of the helical groove 60. The curtain 15 is thus rolled up around the roller shaft 23 and frees the passage opening through the support frame 13, thus allowing the air flow F to circulate through this opening. It is thus possible to bring the curtain 15 back into its open position without necessarily having to use the drive device 38. The automatic return system 50 can in particular be of use in emergency situations.

What is claimed is:

1. An air inlet shut-off device for a motor vehicle, the shut-off device comprising a support frame including a first and a second crosspiece that are parallel to one another and connected by lateral uprights so as to define at least one passage opening for an incoming air flow, said device including at least one curtain that can move between a closed position in which the at least one curtain at least partially covers the at least one passage opening and an open position in which said at least one curtain allows the incoming air flow to pass through the at least one passage opening, said at least one curtain including an edge secured to a first roller shaft extending on the support frame along one of the sides of the at least one passage opening, the first roller shaft being connected to a drive device so as to roll up the at least one curtain around said first roller shaft to bring it into the open position and so as to unroll the at least one curtain to bring it into the closed position, and an automatic return system for the at least one curtain which includes:

an elastic element which is elastic in elongation along the rolling axis of the first roller shaft, said elastic element being secured with a first end to the first roller shaft in such a way as to be rotated by said first roller shaft and vice versa, a cylindrical slider intended to move in translation along the rolling axis of the first roller shaft and in rotation about the rolling axis, said cylindrical slider being secured to a second end of the elastic element in such a way as to be rotated indirectly by the first roller shaft and vice versa, said cylindrical slider also including a helical groove on the outer surface, the support frame including a fixed finger configured to be inserted in the helical groove on the cylindrical slider.

2. The device as claimed in claim 1, wherein the elastic element of the automatic return system for the at least one curtain is a spring having turns helically wound around the rolling axis of the first roller shaft.

3. The device as claimed in claim 1, wherein the elastic element is a traction spring and in that the cylindrical slider has, at an end connected to the elastic element, a wall forming a housing space intended to receive at least some of the turns of the elastic element.

4. The device as claimed in claim 1, wherein endings of the helical groove on the outer face of the cylindrical slider form stops configured to come into contact with the fixed finger of the support frame so as to define the terminal positions of the cylindrical slider in translational movement thereof.

5. The device as claimed in claim 1, wherein the first roller shaft includes a hollow end, while the device further includes a central pin arranged inside the hollow end of the first roller shaft such that it projects from said hollow end, the central pin being configured to move in translation inside the hollow end of the first roller shaft along the rolling axis, and in that the cylindrical slider is rigidly secured to the central pin.

6. The device as claimed in claim 1, wherein one end of the first roller shaft has a shoulder and in that the cylindrical slider and the elastic element are positioned coaxially to this the shoulder so as to be movable in translation on this shoulder along the rolling axis.

7. The device as claimed in claim 6, wherein a linear ball bearing is interposed between the shoulder at the end of the first roller shaft and the cylindrical slider.

* * * * *